UNITED STATES PATENT OFFICE.

DAVID F. SHOPE, OF PORTLAND, OREGON, ASSIGNOR TO SHOPE BRICK CO., OF PORTLAND, OREGON, A CORPORATION OF OREGON.

PROCESS FOR ERECTING CONCRETE STRUCTURES.

1,282,304.

Specification of Letters Patent.  Patented Oct. 22, 1918.

No Drawing. Application filed June 24, 1918. Serial No. 241,696.

*To all whom it may concern:*

Be it known that I, DAVID F. SHOPE, a citizen of the United States, residing at Portland, in the county of Multnomah and State of Oregon, have invented new and useful Improvements in Processes for Erecting Concrete Structures, of which the following is a specification.

My invention relates to a class of processes for erecting concrete structures which are immune to the chemical action of sea water.

The object of my invention is to provide in art or process wherein and whereby a concrete structure may be effectively erected in such a manner that its parts exposed to the contact with water, and particularly sea water, shall be non-absorbent of water, whether transmitted directly, or indirectly through moisture laden air. It is especially adapted and useful in the construction of concrete vessels, as well as piles, walls, wharves and other structures which are in or near sea water and must withstand the chemical action thereof. These objects, as well as others, I accomplish by the art or process herein described.

The experience of those skilled in the art of erecting concrete structures has clearly and fully proven certain things in relation thereto. These things I will briefly summarize. All concrete in sea water, both in northern and in southern climates, is subject to chemical disintegration under certain conditions. Reinforced concrete of excellent quality, designed according to the recommendations of engineering societies and present practice, is subject to relatively rapid deterioration in most localities. The materials and methods used in construction have an important bearing on the durability of concrete, and the design and the protection provided greatly influence the permanency of the structure. Deep erosion takes place along construction seams. Plain concrete, if exposed to physical abrasion, will very soon commence to disintegrate, due to chemical action from sea water. This will take place whenever the original surface of the concrete, as molded, is first abraded or eroded by reason of mechanical means. When green concrete is placed in forms, the lime of the cement, at or near the surface, is in a form to combine readily with carbon dioxid in the atmosphere. Thus there is formed at the surface, and for a slight depth in the mass, lime carbonate or limestone, which is practically insoluble in sea water. This layer, or skin, of insoluble material acts as an armor or protection to uncarbonated cement in the interior of the mass. If concrete is deposited in water it is not exposed to the air, but there is sufficient carbon dioxid in the water to carbonate the lime at the surface, and produce a like result. In the interior of the mass the lime which is freed as the cement ages is changing from the amorphous to the large crystalline form.

It is well known that all concrete in sea water, is subject to chemical disintegration under certain conditions. The materials and methods used in its construction have an important bearing on the durability of concrete. Deep erosin from sea water takes place along construction seams. The chemical action of sea water which may penetrate abrasions causes disintegration. When the interior mass is protected by a skin of insoluble material, the inner uncarbonated cement will not be so exposed. When steel reinforcement is placed in the concrete, and sea water gains access to it, the oxidization of the metal causes it to expand rapidly and furnishes openings which permit the sea water to attack the inner concrete. Painting and covering exposed concrete parts is only a partial and temporary expedient. The concrete should be so compacted that the densest possible condition will be secured. The common wooden forms now used will absorb water from the concrete and prevent the proper forming of the mass. The amount of water therein is a highly important factor. The spading of the mass to produce density is not reliable and is impracticable where reinforcement is provided.

It is to overcome the difficulties in the art as heretofore practised that I have invented my new and useful method of erecting concrete structures, peculiarly and particularly adapted to resist the action of sea water. It is especially devised for the construction of concrete vessels, but is equally useful for any fixed structure in or near sea water.

The first step in my process is to erect the exterior form wall which may be of wood or any suitable material. Upon the entire inner surface of this form there are secured sheets of a flexible material which is nonadhesive and non-absorbent of moisture. These sheets are arranged by lapping in such a manner that no seams shall be produced on the concrete surface. In the case of a vessel the forward sheets would naturally be lapped over the succeeding ones toward the stern. I have found celluloid sheets will respond in every way as a suitable lining material for my purpose, but any other suitable flexible material to accomplish my object in this respect may be substituted without departing from the principle of my invention.

Having erected the outer form wall with its lining as stated, the inner form wall is erected. It may be of wood without a lining and this will not interfere with the results I accomplish as I have already proved by practical tests. A desired mixture of concrete having been prepared, it is poured into the forms but not tamped from above in any manner, nor spaded. The next step is to continuously tap or hammer the exterior of one or both of the form walls at and just below the level of the concrete as it is poured into the form. This causes a quaking of the concrete and its settling in a compact mass. The greater gravity of the concrete causes it to settle and expel from its mass the larger part of the water and all of the air, thus eliminating pockets and voids. The lining sheets prevent adhesive action so that the settling is practically complete as intended. They also prevent absorption and evaporation of moisture remaining in the mass and necessary for its proper curing. The tapping or hammering is done most efficiently by means of hydraulic or pneumatic hammers or other convenient mechanism. This tapping or hammering is continued, as described, until the desired height of concrete structure is attained.

When celluloid is used it accomplishes both of the objects I desire to attain, namely, of preventing the absorption of water by the form wall from the concrete mass, and the producing of a highly enameled outer concrete surface. If the highly enameled surface is not desired, but only a compact mass, as provided in my process, then sheets of flexible tar paper, or other non-absorbent material, may be used and is within the principle of my invention.

When the concrete is thoroughly cured the forms are removed. If the celluloid class of lining is used, a highly enameled and smooth outer surface is provided, especially adapted for vessels. If the second class of lining material is used the concrete will not have so smooth a surface, but in other respects the result of the process is the same. In either case an outer skin of considerable thickness is formed, which will oxidize throughout to lime carbonate and form the desired protection sought. On the other hand, the air being driven out of the inner mass, that part is crystallized into a uniform and compact mass without pockets or voids. The interior being thus fully protected the sea water, or air containing sea water, does not penetrate to the interior where it can attack the crystalline lime chemically. Nor can the chlorin charged sea water penetrate to act upon metal reinforcement embedded in the concrete.

If it is desired to place reinforcing metal in the concrete it is arranged within the form walls after the outer wall with its lining is first placed in position. The inner wall is built up as the reinforcement is arranged. The remaining steps are as already described.

It will be observed that the object of spading is to push back the coarser material in the mass so that the finer particles shall come next to the forms to make a smooth outer surface. It is obvious that this method is not practical when the forms are occupied as well by reinforcing metal, and especially so for vessel construction where the reinforcement is placed near the outer form wall. Also because it is desirable to have coarser material near to the outer surface to make a mass which will better resist the shock from contact with extraneous objects. Further it is desired, particularly in vessels, that all of the coarser material thus placed shall be so surrounded by the finer that no pockets or voids shall be created. My process accomplishes these objects practically and completely. The enameled skin I produce by this process is so dense that it prevents the erosion or deterioration of the interior concrete mass, or oxidation of metal within it, by chemical action.

The inner surface of the concrete structure can be treated with a suitable waterproofing material if it is desired to protect it from the action of air carrying sea water which might come in contact with it.

The highly enameled surface of the concrete, which is thus produced, is of great advantage for concrete ships, as it tends to greatly reduce their friction in the water and will not easily foul with barnacles or other matter. The celluloid can be removed without disfiguring the outer surface or leaving seams therein.

Having described my invention I claim—

In a process or art of the character described, a method of erecting concrete structures which consists, first, in the lining of the inner surface of an outer form wall with sheets of cellulose material, commonly called celluloid, second, the pouring of a desired concrete material in plastic condition into the form thus prepared, third, the continuous tapping or hammering, by any convenient means, upon the outer surface of either or both form walls at and below the level of the concrete mass during the time it is being poured into the form, until the whole mass has been so agitated or quaked that it is all thereby caused to settle within the form in a uniform condition of density, without pockets or voids therein and with a desired outer surface when cured, fourth, allowing the mass thus treated to cure until in condition to be released from the form with a desired density and outer surface, substantially as described.

DAVID F. SHOPE.

Witnesses:
 DELIA SMITH WRIGHT,
 C. W. THOMPSON.